Patented Aug. 8, 1944

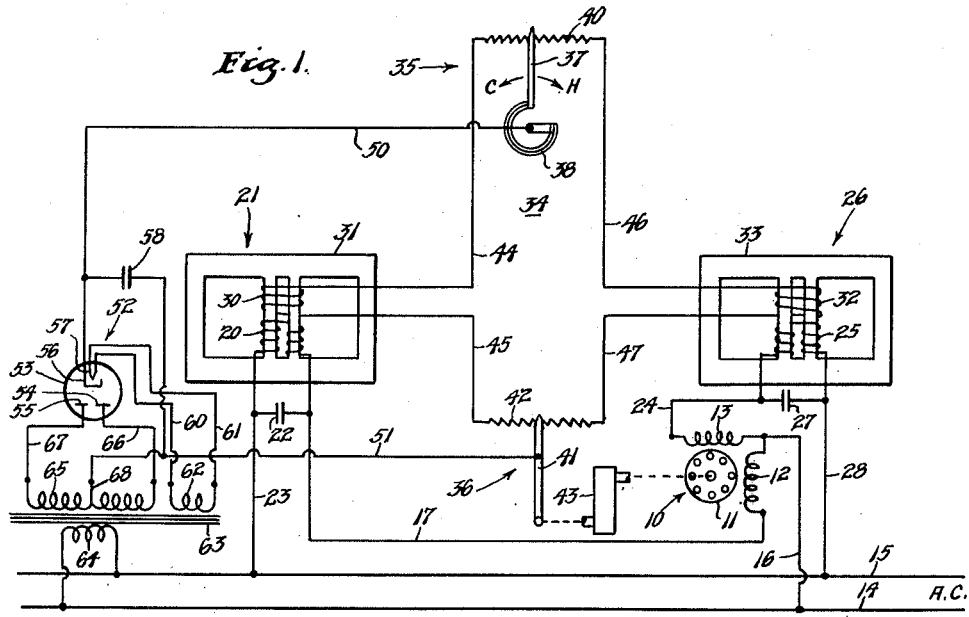

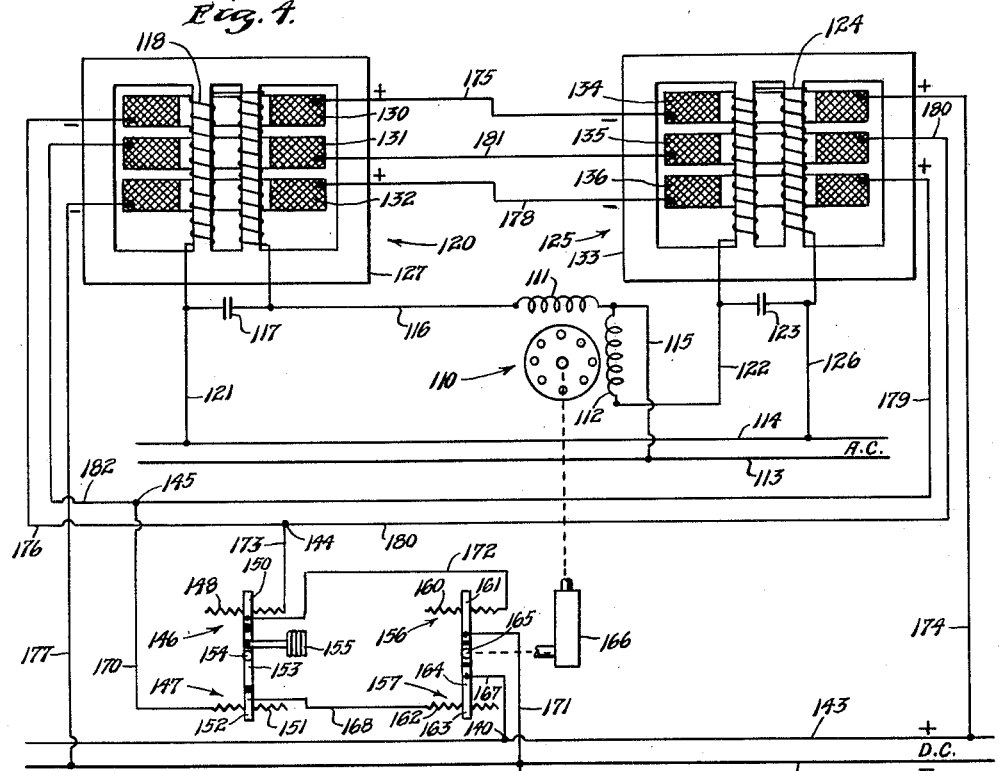
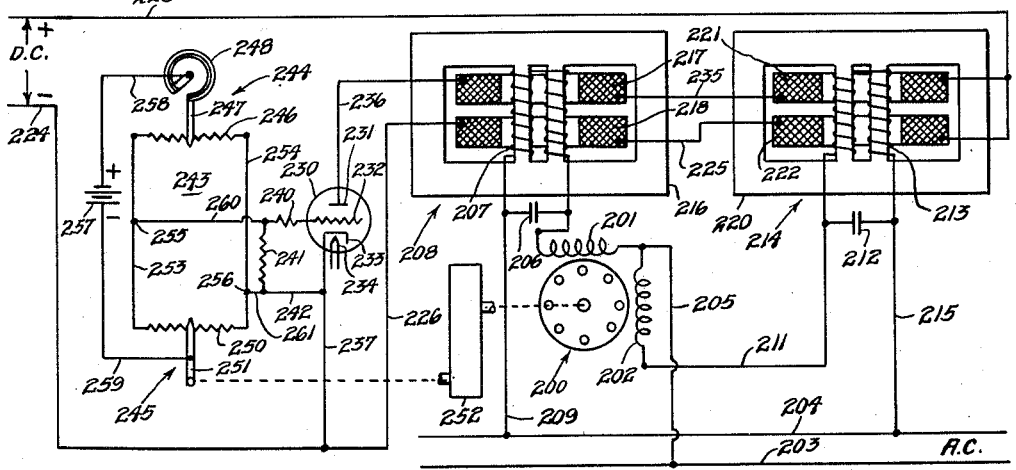

2,355,567

UNITED STATES PATENT OFFICE 2,355,567

CONTROL APPARATUS

Hubert T. Sparrow, Minneapolis, Minn., assignor to Minneapolis-Honeywell Regulator Company, Minneapolis, Minn., a corporation of Delaware Application July 18, 1942, Serial No. 451,433

27 Claims. (Cl. 172—239)

The present invention relates to motor control systems, and particularly to systems in which a reversible motor is controlled in accordance with the changes in a variable condition.

In reversible motor control systems, where the motor is used to operate a recorder or some control device such as a valve, it is frequently desirable to make the systems very sensitive to small changes in the controlling condition. It is also desirable to provide, in such a system, means which prevents the motor from overshooting the point at which it should stop in order to maintain the system in a condition of balance. If the motor does in fact overshoot, the system immediately calls for an operation of the motor in the reverse direction, and this cycle of operation is repeated, causing a continuous oscillation of the motor, known as a "hunting" condition.

In motor control systems generally, when the sensitivity of the system is increased, the tendency of the system to hunt is also increased.

It is therefore an object of the present invention to provide a motor control system of high sensitivity in which the tendency of the system to hunt is minimized.

Another object of the invention is to provide a motor control system utilizing a split phase motor and having a tuned parallel resonant circuit in series with one or both of the motor windings. A further object of the invention is to provide, in such a circuit, means for simultaneously and oppositely varying impedance devices in the tuned circuits so that one tuned circuit becomes capacitive while the other becomes inductive, thereby causing a shift in phase of the currents flowing in the motor winding and producing rotation of the motor.

Another object of the present invention is to provide a motor control system including a split phase motor and a tuned parallel resonant circuit in series with one winding of the motor and improved means for varying the tuning of that circuit including a saturable core reactor.

A further object of the present invention is to provide improved impedance means of the saturable core reactor type which is more sensitive than the reactor means of the prior art.

Another object of the present invention is to provide a control circuit including a pair of saturable core reactor devices, and means for simultaneously and oppositely varying the impedance of the two reactor devices.

Other objects and advantages of the present invention will become apparent from a consideration of the appended specification, claims and drawings, in which Figure 1 represents, somewhat diagrammatically, a motor control system embodying certain features of the present invention, Figure 2 represents a motor control system embodying a modification of the present invention, Figure 3 is a circuit diagram illustrating in a somewhat different aspect, a Wheatstone bridge circuit contained in the system shown in Figure 2, Figure 4 illustrates, somewhat diagrammatically, a different embodiment of my invention, including certain of the features of both Figures 1 and 2, and Figure 5 illustrates, somewhat diagrammatically, a different embodiment of my invention.

There is shown in Figure 1 a system including a motor 10, which may drive a recording, indicating, or controlling device (not shown) and which is controlled in accordance with the temperature adjacent a bimetallic thermostatic element 38.

Referring now to Figure 1, it will be seen that motor 10 has a rotor 11 and a pair of field windings 12 and 13 displaced in space phase as is conventional with split phase motors. The motor windings 12 and 13 are supplied with electrical energy from a pair of alternating current supply lines 14 and 15.

An energizing circuit for motor winding 12 may be traced from supply line 14 through a conductor 16, motor winding 12, a conductor 17, controlled winding 20 of a saturable core reactor 21, in parallel with a condenser 22, and a conductor 23 to supply line 15.

An energizing circuit for motor winding 13 may be similarly traced from supply line 14 through conductor 16, motor winding 13, a conductor 24, a controlled winding 25 of a saturable core reactor 26, in parallel with a condenser 27, and a conductor 28 to supply line 15.

The saturable core reactor 21 includes a saturating winding 30 disposed on the same magnetic core structure 31 as the controlled winding 20. Similarly, the saturable core reactor 26 includes a saturating winding 32 disposed on the same core structure 33 as the controlled winding 25.

The flow of current through the saturating windings 30 and 32 is differentially controlled by a balanced circuit indicated generally at 34.

The balanced circuit 34 includes a control potentiometer indicated generally at 35 and a rebalancing potentiometer indicated generally at 36. The control potentiometer 35 includes a slider 37 supported on the end of a bimetallic thermostat 38, of conventional form, and cooperable with a slidewire resistance 40. The rebalancing potentiometer 36 comprises a slider 41 cooperable with a slidewire resistance 42. The slider 41 is operated by the motor 10 through a gear train schematically indicated at 43.

The left end of slidewire 40 is connected to the left end of slidewire 42 through a conductor 44, saturating winding 30, and a conductor 45. The right end of slidewire 40 is connected to the right end of slidewire 42 through a conductor 46, saturating winding 32, and a conductor 47. The sliders 37 and 41 are connected to the opposite terminals of a suitable source of unidirectional electrical energy by means of conductors 50 and 51, respectively.

The source of unidirectional electrical energy is shown in Figure 1 as a full wave rectifier circuit 52, of conventional type. The rectifier circuit 52 includes a twin diode 53 having a pair of anodes 54 and 55, a cathode 56, and a heater filament 57. The heater filament 57 is supplied with electrical energy through conductors 60 and 61 connected to one secondary winding 62 of a transformer 63. Transformer 63 is also provided with a primary winding 64 connected to the alternating current supply lines 14 and 15, and another secondary winding 65 which supplies the anode-cathode circuits of the twin diode 53. Anode 54 is connected to the right terminal of secondary winding 65 through a conductor 66, and anode 55 is connected to the left terminal of secondary winding 65 through a conductor 67. Secondary winding 65 is provided with a center tap 68 which is connected directly to conductor 51. Cathode 56 of twin diode 53 is connected to conductor 50. It will be readily understood by those skilled in the art that the two anode-cathode circuits of the twin diode 53 are conductive on alternate half cycles, and produce a flow of unidirectional current through the circuit connected to the conductors 50 and 51. A condenser 58 is connected between conductors 50 and 51 to filter out the double frequency component present in the output of rectifiers such as that shown at 52.

*Operation of Figure 1*

When the sliders 37 and 41 are in their respective center positions, as shown in the drawings, the direct current flowing through the balanced circuit 34 divides equally between the opposite sides of the circuit, since the impedances of the two sides are equal. Equal currents therefore flow through the saturating windings 30 and 32 of the reactors 21 and 26. Since the core structures 31 and 33 are similar, they are equally saturated by these currents. The impedances of the controlled windings 20 and 25 are therefore equal.

The controlled windings 20 and 25 are so proportioned with respect to their associated condensers 22 and 27, that they form parallel resonant circuits when the currents flowing through the saturating windings 30 and 32 are of the magnitude obtained when the circuit 34 is balanced.

In other words, when the parts are in the positions shown in the drawings, the controlled winding 20 and the condenser 22 form a parallel resonant circuit in series with the motor winding 12. At the same time, the controlled winding 25 and the condenser 27 form a parallel resonant circuit in series with the motor winding 13. These parallel resonant circuits act as high impedances in series with each of the motor windings 12 and 13. The currents flowing through windings 12 and 13 are therefore relatively small. Furthermore, these parallel resonant circuits present a substantially resistive impedance to the flow of current through them. The currents flowing through the windings 12 and 13 are therefore equal and of the same phase angle. In accordance with the well known characteristics of split phase motors, the windings 12 and 13 must be supplied with currents displaced in phase in order to cause rotation of the motor. Since, under the conditions described, the currents flowing through windings 12 and 13 are in phase with each other, no rotation of motor 10 is produced, and the recording, indicating or controlling device (not shown) operated by the motor is not driven.

Let it now be assumed that the temperature adjacent the bimetallic element 38 decreases, thereby causing the bimetallic element 38 to move slider 37 to the left along slidewire 40, as indicated by the legend in the drawings. This movement of slider 37 reduces the resistance in series with saturating winding 30, and increases the resistance in series with saturating winding 32. The current flow through winding 30 is thereby increased, increasing the saturation of the core 31, and decreasing the impedance of the controlled winding 20. Since the impedance of condenser 22 is constant, the impedance of the parallel resonant circuit including controlled winding 20 and condenser 22 is thereby rendered predominantly capacitive. On the other hand, the decrease in current through saturating winding 32 decreases the saturation of core 33, thereby increasing the impedance of controlled winding 25. The impedance of the parallel resonant network including controlled winding 25 and condenser 27 is thereby rendered predominantly inductive.

Motor winding 12 then has a capacitive impedance connected in series with it, while motor winding 13 has an inductive impedance connected in series with it. The difference in the nature of these two impedances produces a difference in phase between the currents flowing in the two windings 12 and 13, the current in winding 12 tending to lead the current flowing in winding 13. The motor 10 is thereby caused to rotate in a direction so as to move the slider 41 to the right along slidewire resistance 42. Rotation of motor 10 in this direction continues until slider 41 has been moved to the right far enough so that the resistance in series with saturating winding 30 has been increased and the resistance in series with saturating winding 32 has been decreased by an amount sufficient to match and counteract the corresponding changes in resistance caused by movement of slider 37.

It will be readily understood that if the slider 37 moves to the right from the position shown in the drawings, the impedance of controlled winding 20 is increased while that of controlled winding 25 is decreased. The impedance in series with winding 12 is thereby made effectively inductive and the impedance in series with winding 13 is made effectively capacitive. The current in winding 12 then lags the current flowing in winding 13 and causes operation of motor 10 in the opposite direction so as to move slider 41 to the left along resistance 42 and rebalance the network 34.

It may therefore be seen that when the circuit 34 becomes unbalanced, the currents flowing in the windings 12 and 13 are simultaneously shifted in phase but in opposite senses. The system has a high degree of sensitivity, since both motor windings are simultaneously utilized to produce a response of the motor to the controlling condition.

Figures 2 and 3

Figures 2 and 3 illustrate a motor control system using a split phase motor and a single saturable core reactor which is so constructed as to change the impedance of its controlled winding very rapidly in response to changes in a controlling condition.

Referring now to Figure 2, there is shown a split phase motor 70 having a pair of windings 71 and 72 displaced in space phase. Both windings 71 and 72 are supplied with electrical energy from a pair of alternating current supply lines 73 and 74. One terminal of winding 72 is connected directly to supply line 73, while its opposite terminal is connected to supply line 74 through a fixed condenser 75. The fixed condenser 75 is provided to adjust the normal phase of the current flowing through winding 72, and may be omitted if found unnecessary.

Motor winding 71 likewise has one of its terminals connected directly to supply 73, but its opposite terminal is connected to supply line 74 through a conductor 76 and a parallel resonant circuit comprising a condenser 77 and controlled winding 80 of a saturable core reactor generally indicated at 81.

The reactor 81 has a core structure 82 including a pair of outer legs and a pair of inner legs. The controlled winding 80 is wound in the conventional manner on the two inner legs. The reactor 81 has three saturating windings 83, 84 and 85.

The saturating windings 83, 84 and 85 are connected in a Wheatstone bridge circuit shown at 86 in Figure 3. The Wheatstone bridge circuit 86 is also shown in Figure 2, but is laid out in Figure 3 so as to appear to the observer more like a conventional bridge circuit. The windings 83 and 85 are connected in opposite arms of the bridge circuit, while the winding 84 is connected in a diagonal arm of the bridge circuit 86. The balance condition of the bridge circuit 86 is controlled by four rheostats 87, 88, 89 and 90. These rheostats are connected in the other pair of opposite arms of bridge circuit 86. The rheostats 87 and 89 are connected in series in one of these arms, while the rheostats 88 and 90 are connected in series in the other arm.

The rheostats 87 and 88 are simultaneously operated by a pair of slider contacts 91 and 92 on the opposite end of a contact arm 93 pivoted at 94 and rotated about its pivot by a thermostatic element 95 which may be of the vapor-filled bellows type. The rheostats 89 and 90 are operated by a pair of slider contacts 96 and 97 on the opposite ends of a contact arm 98 pivoted at 99 and rotated by operation of motor 70 through a gear train schematically indicated at 100.

The bridge circuit 86 is supplied with unidirectional electrical energy from a pair of direct current supply lines 101 and 102.

Referring more particularly to Figure 3, it will be seen that the bridge circuit 86 comprises a pair of input terminals 103 and 104 connected to D. C. supply lines 101 and 102, respectively. The bridge circuit 86 also has a pair of output terminals 105 and 106, between which winding 84 is connected.

Operation of Figures 2 and 3

When the bridge circuit 86 is balanced, no current flows in the saturating winding 84 connected between output terminals 105 and 106. Current flows, however, in windings 83 and 85. These windings 83 and 85 are so disposed on the core structure 82 that their magnetic effects add, and the core structure 82 is therefore saturated to a certain extent by the current in these windings 83 and 85. Controlled winding 80 and condenser 77 are so proportioned that the phase of the current flowing through motor winding 71 is the same as that flowing through motor winding 72 when the bridge circuit 86 is balanced. Therefore motor 70 is not operated when the bridge is balanced.

Let it now be assumed that the temperature adjacent the thermostatic bellows 95 falls, thereby causing the bellows to contract and rotate the contact arm 93 clockwise about the pivot 94. This decreases the amount of resistance 87 connected in the upper left branch of the bridge circuit and simultaneously decreases the amount of resistance 88 connected in the lower right branch of the bridge circuit. The decrease in resistance of the upper left branch causes output terminal 105 to assume a more positive potential and the decrease in resistance of the lower right branch causes output terminal 106 to assume a more negative potential. A current therefore flows through coil 84 in a direction from output terminal 105 to output terminal 106 as indicated by the arrow 107 adjacent coil 84 in Figure 3. At the same time, the currents flowing through windings 83 and 85 are decreased. By referring to Figure 2, it will be seen that this current flowing through winding 84 produces a magnetic effect opposite in direction to the magnetic effect produced by the current flowing in the windings 83 and 85. The net saturating effects of the three windings 83, 84 and 85 are thereby reduced, and the impedance of controlled winding 80 is increased. The impedance in series with motor winding 71 therefore assumes a predominantly inductive character, and shifts the phase of the current flowing through winding 71 so as to make that current lag the current flowing through motor winding 72. Because of this difference in phase between the currents in the motor windings, the motor 70 is caused to rotate in a direction to rotate contact arm 98 in a counter-clockwise direction, about its pivot 99, thereby increasing the proportion of resistance 89 connected in the upper left arm of the bridge circuit 86 and similarly increasing the proportion of resistance 90 connected in the lower right arm of the bridge circuit 86. This operation continues until the bridge circuit is again balanced, the operation of rheostats 89 and 90 counteracting the operation of rheostats 87 and 88. When a balanced condition is again reached, the motor is stopped.

Beginning again with the parts in the position shown in the drawings, let it now be assumed that the temperature adjacent the bellows 95 increases, thereby rotating contact arm 93 in a counter-clockwise direction about its pivot 94. This increases the proportion of resistance 87 in the upper left arm of the bridge circuit and the proportion of resistance 88 in the lower right arm of the bridge circuit. The potential of output terminal 105 is therefore shifted in a negative direction and the potential of output terminal 106 is shifted in a positive direction. Current then flows through saturating winding 84 in a direction from terminal 106 to terminal 105 as indicated by the arrow 108 in Figure 3. Thus by reference to Figure 2, it will be seen that the current now flowing in winding 84 produces a magnetic effect which adds with the magnetic effect of windings 83 and 85. The saturation of the core structure 83 is thereby increased, causing a corresponding decrease in the impedance of controlled winding 80. The impedance in series with motor winding 71 therefore becomes predominantly capacitive, causing the current in winding 71 to lead the current in winding 72 and producing rotation of motor 70 in a direction to drive the contact 98 clockwise. Operation of contact arm 98 clockwise decreases the proportion of resistance 89 in the upper left arm of bridge 86 and likewise decreases the proportion of resistance 90 in the lower right arm, thereby rebalancing the bridge and reducing the current through winding 84 to zero again.

In order to further increase the sensitivity of the system shown in Figures 2 and 3, the winding 84 may be wound of resistance material having a lower specific resistance than the material used for windings 83 and 85. In this way, a given unbalance current flowing in winding 84 passes through a greater number of turns per unit of resistance than the same current flowing in windings 83 and 85. The ampere turns, which serve as a measure of the magnetic effect, are then greater in winding 84 than in either winding 83 or 85. Therefore, when the bridge circuit is unbalanced, the magnetic effect of winding 84 changes more rapidly than the effect of windings 83 and 85. Hence the saturation of the core is changed more rapidly upon unbalance of the bridge circuit 86 than the unbalance effect itself. The rate of motor operation is thereby made to vary in such a manner that the ratio between the rebalancing effect and the unbalancing effect increases as the unbalancing effect increases.

*Figure 4*

In Figure 4 is shown a motor control system which combines the advantages of both the systems shown in Figures 1 and 2.

In Figure 4 is shown a split phase motor 110 having a pair of field windings 111 and 112 displaced in space phase. The windings 111 and 112 are adapted to be energized from a pair of alternating current supply lines 113 and 114. An energizing circuit for winding 111 may be traced from supply line 113 through a conductor 115, motor winding 111, a conductor 116, a parallel resonant network comprising a condenser 117 and controlled winding 118 of a saturable core reactor generally indicated at 120, and a conductor 121 to supply line 114. An energizing circuit for motor winding 112 may be traced from supply line 113 through conductor 115, motor winding 112, a conductor 122, a parallel resonant circuit including a condenser 123 and controlled winding 124 of a saturable core reactor 125, and a conductor 126 to supply line 114.

Reactor 120 comprises a core structure 127 of conventional form, three saturating windings 130, 131 and 132, and the controlled winding 118. The reactor 125 comprises a core structure 133, three saturating windings 134, 135 and 136, and the controlled winding 124.

The saturating windings 130, 131, 132 and 134, 135 and 136 are connected in a Wheatstone bridge circuit generally similar to that described in connection with Figures 2 and 3. This bridge circuit has a pair of input terminals 140 and 141 connected to direct current supply lines 142 and 143. The bridge circuit also has the usual pair of output terminals indicated at 144 and 145.

In addition to the six saturating windings, the bridge circuit of Figure 4 includes a pair of control rheostats 146 and 147. The control rheostat 146 comprises a slidewire resistance 148 and a slider 150 cooperable therewith. The control rheostat 147 similarly comprises a slidewire resistance 151 and a slider 152 cooperable therewith. The sliders 150 and 152 are carried at the opposite ends of a contact arm 153, which is rotatable about a pivot 154 by a thermostatic device 155, indicated as a vapor-filled bellows type of thermostat.

The bridge circuit of Figure 4 also includes a pair of rebalancing rheostats 156 and 157. Rheostat 156 includes a slidewire resistance 160 and a slider 161 cooperable therewith. Rheostat 157 comprises a slidewire 162 and a slider 163 cooperable therewith. The sliders 161 and 163 are carried at the opposite ends of a contact arm 164 which is rotatable about a pivot 165 by operation of motor 110 acting through a gear train indicated schematically at 166.

A first branch of the bridge circuit in Figure 4 connects the input terminal 140 with output terminal 145 and corresponds generally to the lower right-hand branch of the bridge circuit 86 of Figure 3. This branch may be traced from input terminal 140 through a conductor 167, contact 163, resistance 162, a conductor 168, contact 152, resistance 151, and a conductor 170 to output terminal 145.

A second branch of the bridge circuit in Figure 4 connects input terminal 141 with output terminal 144 and corresponds generally to the upper left branch of bridge circuit 86 in Figure 3. This branch may be traced from terminal 141 through a conductor 171, contact 161, resistance 160, a conductor 172, contact 150, resistance 148, and a conductor 173 to output terminal 144.

A third branch of the bridge circuit in Figure 4 connects input terminal 140 with output terminal 144 and corresponds generally to the upper right-hand branch of the bridge circuit 86 in Figure 3. This branch may be traced from terminal 140 to the right along supply 143, through a conductor 174, saturating winding 134, a conductor 175, saturating winding 130 and a conductor 176 to output terminal 144.

The fourth branch of the bridge circuit in Figure 4 connects input terminal 141 with output terminal 145 and corresponds generally to the lower left branch of bridge circuit 86 in Figure 3. This branch may be traced from input terminal 141 to the left along supply line 142, and through a conductor 177, saturating winding 132, a conductor 178, saturating winding 136, and a conductor 179 to output terminal 145.

The output circuit of the Wheatstone bridge in Figure 4 interconnects output terminals 144 and 145 and is comparable to the diagonal connection between output terminals 105 and 106 in Figure 3. This output circuit may be traced from output terminal 144 through a conductor 180, saturating winding 135, a conductor 181, saturating winding 131, and a conductor 182 to output terminal 145.

*Operation of Figure 4*

When the parts are in the positions shown in the drawings, the output terminals 144 and 145 are at the same potential so that the bridge is balanced. Under these conditions, no current flows in the output branch of the bridge circuit including the saturating windings 135 and 131. The cores 127 and 133 of the reactors 120 and 125 are therefore equally saturated and the impedances of their controlled windings 118 and 124 are equal. The impedances in series with each of the motor windings 111 and 112 are therefore equal and their currents are in phase so that the motor 110 does not rotate.

Under these conditions, assume that the temperature adjacent the thermostatic bellows 155 increases causing the bellows to expand and rotate the contact arm 153 in a counterclockwise direction about its pivot 154. This increases the portion of resistance 148 in the branch of the bridge circuit between output terminal 144 and its negative input terminal 141. The potential of output terminal 144 is therefore rendered more positive. At the same time, an increased portion of resistance of 151 is inserted in the branch of the bridge circuit connecting output terminal 145 and positive input terminal 120. Therefore, the potential of output terminal 145 is rendered more negative. Current therefore flows in the output branch of the bridge circuit in a direction from output terminal 144 to output terminal 145.

It should be noted that all three of the saturating windings 134, 135 and 136 of reactor 133 are wound in the same sense. This is indicated by the fact that their right-hand terminals are located at the top of the respective coils, and their left-hand terminals at the bottom. Furthermore, the connections of windings 134 and 136 are such that their right-hand terminals are normally positive as indicated by the legend in the drawings. When a current flows in the output branch of the bridge from terminal 144 to terminal 145, the flow is in such a direction that the right-hand terminal of saturating winding 135 is positive with respect to its left-hand terminal. Since all three windings of reactor 125 are wound in the same sense, the current in winding 135 produces a magnetic effect which adds with that of the currents in windings 134 and 136, thereby increasing the saturation of core 133. The impedance of controlled winding 124 is thereby decreased from its normal value and the impedance in series with motor winding 112 is rendered predominantly capacitive.

Referring now to reactor 120, it will be seen that the saturating winding 131 is wound in a sense opposite to that of windings 130 and 132. This is indicated by the fact that the right-hand terminal of winding 131 is at the lower part of the winding and the left-hand terminal at the upper part of the winding, while with windings 130 and 132, their right-hand terminals are at the upper part of the respective windings and their left-hand terminals at the lower part. Furthermore, the connections of windings 130 and 132 are such that their right-hand terminals are positive and their left-hand terminals are negative. When the bridge is unbalanced in the sense previously mentioned, the current flows through winding 131 in a direction such that its right-hand terminal is positive and its left-hand terminal negative. This winding 131 is wound in a sense oppositely to that of windings 130 and 132, however. The magnetic effect of the current flowing in winding 131 opposes that of the currents flowing in windings 130 and 132, thereby decreasing the saturation of core 127, and increasing the impedance of controlled winding 118. The impedance in series with motor winding 111 is thereby made predominantly inductive, causing the current flow through motor winding 111 to lag its former phase position.

A phase difference is thereby produced between the current in motor windings 111 and 112 causing rotation of the motor in a direction to drive contact arm 164 in a clockwise direction about its pivot 165, thereby decreasing the resistance in the opposite bridge arms to counteract the increase of resistance caused by operation of thermostat 155. The motor operation continues until the bridge is rebalanced, at which time the motor stops.

Let it now be assumed that the temperature adjacent the thermostat 155 decreases, beginning with the parts in the positions shown in the drawings. This decreases the resistance in the arms of the bridge circuit which include rheostats 146 and 147, thereby unbalancing the bridge circuit in the opposite direction, making output terminal 145 positive with respect to output terminal 144 so that a current flows from output terminal 145 to output terminal 144. In passing through saturating winding 131, the polarity of this current is such that the left-hand terminal of winding 131 is positive while its right-hand terminal is negative. The polarity of the current is therefore opposite to that of the currents in windings 130 and 132. Since the winding 131 is wound in a sense opposite to that of windings 130 and 132, however, the magnetic effect of the three coils are now in the same direction and aid each other in increasing the saturation of the core 127. The impedance of controlled winding 118 is thereby decreased, causing the impedance in series with motor winding 111 to become predominantly capacitive. On the other hand, the current now flowing in saturating winding 135 is opposite in polarity to the currents flowing in the saturating windings 134 and 136, and all three coils are wound in the same sense. Therefore the magnetic effect of winding 135 now opposes those of windings 134 and 136, thereby decreasing the saturation of core 133 and increasing the impedance of controlled winding 124. The impedance in series with motor winding 112 is rendered predominantly inductive, and a difference in phase is produced between the currents in the motor windings 111 and 112 in a direction such as to drive the contact arm 164 in a counter-clockwise direction, increasing the proportions of rheostat resistances 160 and 162 in the opposite branches, and rebalancing the bridge circuit.

It may therefore be seen that in the motor control system of Figure 4, the sensitivity is enhanced by the use of a pair of tuned circuits one in series with each of the motor windings, and that its sensitivity is further enhanced by the use of the particular type of saturable core reactor having its windings connected in a bridge circuit as indicated in Figures 2 and 3. Furthermore, the windings 131 and 135 may be wound of resistance material having a lower specific resistance than the material used for windings 130, 132, 134, and 136, in order to increase the sensitivity of the bridge circuit. Such an arrangement was discussed in detail in connection with windings 83, 84 and 85 of Figures 2 and 3, and need not be further described here.

*Figure 5*

There is shown in Figure 5 a split phase motor 200 having field windings 201 and 202. The windings 201 and 202 are supplied with electrical energy from a pair of alternating current supply lines 203 and 204. The energizing circuit for winding 201 may be traced from supply line 203 through a conductor 205, winding 201, a tuned parallel resonant circuit comprising a condenser 206 in parallel with controlled winding 207 of a saturable core reactor generally indicated at 208, and a conductor 209 to supply line 204. The energizing circuit for winding 202 may be traced from supply line 203 through a conductor 210, motor winding 202, a conductor 211, a parallel resonant circuit including a condenser 212 and a controlled winding 213 of a saturable core reactor generally indicated at 214, and a conductor 215 to supply line 204.

The reactor 208 comprises a magnetic core structure 216, of conventional form, a pair of saturating windings 217 and 218, and the controlled winding 207. The reactor 214 comprises a magnetic core structure 220, a pair of saturating windings 221 and 222, and the controlled winding 213.

The saturating windings 218 and 222 are connected in series between a pair of D. C. supply lines 223 and 224. This connection may be traced from supply line 223 through winding 222, a conductor 225, winding 218, and a conductor 226 to supply line 224.

The saturating windings 217 and 221 are connected in series with the output circuit of an electronic amplifier across the D. C. supply lines 223 and 224.

The amplifier may be of any suitable type and is shown by way of example as a triode 230 having an anode 231, a control electrode 232, a cathode 233, and a heater filament 234. The heater filament 234 may be energized from any convenient source of electrical energy (not shown).

The series connection including the saturating windings 217 and 221 may be traced from positive D.C. supply line 223 through winding 221, a conductor 235, saturating winding 217, a conductor 236, anode 231, cathode 233, and a conductor 237 to negative D. C. supply line 224. Control electrode 232 is connected to cathode 233 through a protective resistance 240, a biasing resistance 241, and a conductor 242.

The potential drop across the biasing resistance 241 is controlled by a balanced network 243 including a control potentiometer 244 and a rebalancing potentiometer 245. The control potentiometer 244 includes a slidewire resistance 246 and a slider 247 carried by a bimetallic thermostatic element 248. The rebalancing potentiometer 245 includes a slidewire resistance 250 and a slider 251 cooperable therewith. The slider 251 is moved over the slidewire 250 by operation of motor 200 through a gear train 252, shown diagramatically.

The left-hand terminals of slidewires 246 and 250 are connected by a conductor 253. The right-hand terminals of slidewires 246 and 250 are connected by a conductor 254. The balanced network 243 is generally in the form of a Wheatstone bridge, of which the sliders 247 and 251 form the input terminals and having output terminals 255 and 256 connected in conductors 253 and 254, respectively. Direct current is supplied to the sliders 247 and 251 from any suitable source, shown as a battery 257 connected to slider 247 by a conductor 258 and connected to slider 251 by a conductor 259.

The terminal of biasing resistor 241 nearest the control electrode 232 is connected by a conductor 260 with the network output terminal 255, while the terminal of biasing resistor 241 nearest the cathode 233 is connected with network output terminal 256 by a conductor 261.

Operation of Figure 5

When the parts are in the positions shown in the drawings, the network 243 is balanced so that the output terminals 255 and 256 are at the same potential. The control electrode 232 is therefore at the same potential as cathode 233 and the output circuit of triode 230 therefore conducts a predetermined amount of current, depending upon the characteristics of the triode. This current flows through saturating windings 217 and 221.

The saturating windings 217 and 218 are wound in the same sense as shown by the position of their corresponding terminals, and are supplied with current of the same polarity. Therefore, their saturating effects aid each other. The condenser 206 is so chosen and related to the controlled winding 207 that when the control eletrode 232 is at the same potential as cathode 233, the condenser 206 and winding 207 form a parallel resonant circuit.

In the reactor 214, the saturating winding 222 is wound in a sense opposite to that of winding 221, as indicated by this position of their corresponding terminals. When currents of the same polarity flow through both windings 221 and 222, their magnetic effect oppose each other. The condenser 212 is so chosen and proportioned with respect to controlled winding 213, that when control electrode 232 is at the same potential as cathode 233, the condenser 212 and winding 213 form a parallel resonant circuit. Therefore, when the bridge circuit 243 is balanced, the impedances in series with motor windings 201 and 202 are such as to make their currents in phase with each other, thereby preventing rotation of motor 200.

Let it now be assumed that the temperature adjacent the thermostatic element 248 increases, and that this increase in temperature is effective to move slider 247 to the left along resistance 246. This decreases the resistance between output terminal 255 and slider 247. Since slider 247 is connected to the positive terminal of battery 257, the potential of output terminal 255 is made more positive. At the same time, the resistance between slider 247 and output terminal 256 is increased, thereby making output terminal 256 more negative. A potential difference is thereby set up across resistance 241, making control electrode 232 more positive than cathode 233. The conductivity of the output circuit of triode 230 is increased, and an increased current flows through the windings 217 and 221. This current flowing through winding 217 increases the saturation of core 216, thereby reducing the impedance of controlled winding 207 and rendering the impedance in series with motor winding 201 predominantly capacitive. On the other hand, this current flowing in winding 221 further opposes the predominating magnetic effect of saturating winding 222, thereby reducing the saturation of core 220 and increasing the impedance of controlled winding 213. The impedance in series with motor windng 202 thereby becomes predominantly inductive. The current in motor winding 201 therefore leads the current in motor winding 202 and causes rotation of motor 200 in a direction so as to drive slider 251 to the left and rebalance the bridge circuit 243. As soon as the bridge circuit is rebalanced, the motor 200 is again stopped.

On the other hand, when slider 247 moves to the right along slidewire resistance 246, the potential of control electrode 232 is made negative with respect to that of cathode 233, thereby decreasing the conductivity of the output circuit of triode 230. This reduces the saturating magnetic flux in the core 216, increasing the impedance of controlled winding 207 and making the impedance in series with motor winding 201 predominantly inductive. At the same time, in reactor 214 the opposing effect of winding 221 is reduced, thereby permitting the saturating effect of winding 222 to increase the saturation of core 220, decreasing the impedance of controlled winding 213 and rendering the impedance in series with motor winding 202 predominantly capacitive.

The phase of the currents flowing in the motor windings 201 and 202 is now shifted in the opposite sense to that previously encountered, and motor 200 runs in a direction to move slider 251 to the right along resistance 250 and balance the bridge circuit 243.

It should be pointed out that Figure 5 illustrates another modification of a motor control system utilizing an effect also present in Figure 4. That is, the use of a saturable core reactor wherein a normal saturating flux is produced by one saturating winding, and the current flow through another saturating winding is utilized to increase or decrease the total saturating flux in the core of the reactor. In both cases, two such reactors are used as the inductive members in parallel resonant circuits controlling the phase of currents flowing through the windings of a split phase motor.

While I have shown and described certain preferred embodiments of my invention, other modifications thereof will readily occur to those skilled in the art, and I therefore wish my invention to be limited only by the appended claims.

I claim as my invention:

1. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, impedance means connected in series circuit with each of said windings and said pair of terminals, said impedance means including, for each winding, a capacitive impedance element and an inductive impedance element connected in parallel and normally tuned to resonance at said frequency, and means for simultaneously and oppositely varying the impedance of corresponding elements in the circuit connections of the two windings so as to cause a phase displacement in the currents flowing therethrough.

2. A motor control system, comprising in combination, a reversible motor having a pair of field windings adapted when supplied with alternating electrical currents displaced in time phase to cause rotation of said motor in a direction determined by the sense of displacement of said currents, a pair of terminals adapted for connection to a source of alternating electrical energy of substantially constant frequency, impedance means connected in series circuit with each of said windings and said pair of terminals, said impedance means including, for each winding, a capacitive impedance element and an inductive impedance element connected in parallel and normally tuned to resonance at said frequency, control means for simultaneously and oppositely varying the impedance of corresponding elements in the circuit connections of the two windings so as to cause a phase displacement in the currents flowing therethrough, and means for selectively operating said control means in opposite senses to control the direction of rotation of said motor.

3. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, and means for simultaneously and oppositely varying the saturating effects of the saturating winding means on said pair of reactors, thereby causing a phase displacement between the currents flowing in said windings.

4. A motor control system, comprising in combination, a reversible motor having a pair of field windings adapted when supplied with alternating electrical currents displaced in time phase to cause rotation of said motor in a direction determined by the sense of displacement of said currents, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, a normally balanced control circuit, means effective upon unbalance of said circuit to simultaneously and oppositely vary the saturating effects of the two saturating winding means in a sense dependent upon the direction of unbalance of said circuit, and means driven by said motor for rebalancing said control circuit.

5. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, a normally balanced control circuit having a pair of branches in which equal currents flow when said circuit is balanced, means for unbalancing said circuit so as to differentially vary the currents in said branches, and means connecting each of said saturating windings in one of said branches.

6. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, each said saturating winding means comprising a pair of coils, means connecting a first coil of each pair in a first series circuit, means connecting the second coil of each pair in a second series circuit, said second coils being connected and arranged on their respective reactors so that upon a current flow in a given direction through said second series circuit, the magnetic effect of one of said second coils aids and that of the other opposes the effects of their respective first coils, and means for varying the current flow in at least one of said series circuits.

7. A motor control system, comprising in combination, a reversible motor having a pair of field winding adapted when supplied with alternating electrical currents displaced in time phase to cause rotation of said motor in a direction determined by the sense of displacement of said currents, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, each said saturating winding means comprising a pair of coils, means connecting a first coil of each pair in a first series circuit, means connecting the second coil of each pair in a second series circuit, said second coils being connected and arranged on their respective reactors so that upon a current flow in a given direction through said second series circuit, the magnetic effect of one of said second coils aids and that of the other opposes the effects of their respective first coils, a normally balanced electrical network, means responsive to the unbalance of said balanced network for varying the current flow in at least one of said series circuits, and means driven by said motor for rebalancing said normally balanced network.

8. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, each said saturating winding means comprising a pair of coils, means connecting a first coil of each pair in a first series circuit, means connecting the second coil of each pair in a second series circuit, said second coils being connected and arranged on their respective reactors so that upon a current flow in a given direction through said second series circuit, the magnetic effect of one of said second coils aids and that of the other opposes the effects of their respective first coils, and means including an electronic amplifier for variably controlling the current flow in at least one of said series circuits.

9. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency and time phase, a saturable core reactor, having saturating winding means and controlled winding means, an electrical network tuned to be normally resonant at said frequency, said network including said controlled winding means and a condenser in parallel, means connecting one of said field windings to said terminals including said network in series therewith, said saturating winding means comprising three coils, a normally balanced bridge circuit including two of said coils in opposite arms and the third coil between opposite terminals thereof, means for unbalancing said bridge circuit so as to vary the impedance of said controlled winding means, and thereby vary the phase of the alternating current supplied to said one field winding, and means connecting the other of said field windings to said pair of terminals.

10. A motor control system, comprising in combination, a reversible motor having a pair of field windings adapted when supplied with alternating electrical currents displaced in time phase to cause rotation of said motor in a direction determined by the sense of displacement of said currents, a pair of terminals adapted for connection to a source of alternating electrical energy of substantially constant frequency, a saturable core reactor, having saturating winding means and controlled winding means, an electrical network tuned to be normally resonant at said frequency, said network including said controlled winding means and a condenser in parallel, means connecting one of said windings to said terminals including said network in series therewith, said saturating winding means comprising three coils, a normally balanced bridge circuit including two of said coils in opposite arms and the third coil between opposite terminals thereof, means for unbalancing said bridge circuit so as to vary the impedance of said controlled winding means, and thereby vary the phase of the alternating current supplied to said one field winding, means connecting the other of said field windings to said pair of terminals, and means operated by said motor for rebalancing said bridge circuit.

11. Variable impedance means comprising in combination, a saturable core reactor having saturating winding means and controlled winding means whose impedance is to be varied, said saturating winding means comprising three coils, a normally balanced bridge circuit including two of said coils in opposite arms and the third coil between opposite terminals thereof, and means for varying the balance condition of said bridge circuit.

12. A motor control system, comprising in combination, a motor having a pair of field windings adapted when supplied with alternating electrical currents displaced in time phase to cause rotation of said motor, impedance means connected in series with each of said windings, said impedance means comprising, for each winding, a capacitive element and an inductive element connected in parallel and normally tuned to resonance, and means for simultaneously and oppositely varying the tuning of said impedance means so as to render one capacitive and the other inductive.

13. In combination, a normally balanced electrical network, a motor having a pair of field windings adapted when supplied with alternating electrical currents displaced in time phase to cause rotation of said motor, impedance means connected in series with each of said windings, said impedance means comprising, for each winding, a capacitive element and an inductive element connected in parallel and normally tuned to resonance, means for unbalancing said network, means responsive to unbalance of said network for simultaneously and oppositely varying the tuning of said impedance means so as to selectively render one inductive and the other capacitive, depending on the direction of unbalance of said network, and means operated by said motor for rebalancing said network.

14. A motor control system, comprising in combination, a reversible motor having a pair of field windings adapted when supplied with alternating electrical currents displaced in time phase to cause rotation of said motor in a direction determined by the sense of displacement of said currents, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, each saturating winding means comprising a set of three coils, a normally balanced bridge circuit having input terminals, output terminals and two pairs of opposite arms, and including a coil of each set connected in series in each of one pair of opposite arms thereof, and the third coil of each set connected in series between the output terminals thereof, said input terminals being adapted for connection to a source of unidirectional electrical energy, means in the other pair of opposite arms of said bridge circuit for varying the resistance thereof so as to unbalance said bridge, further means in the other pair of arms for rebalancing said bridge, and a driving connection between said motor and said rebalancing means.

15. In combination, an electrical bridge circuit having input terminals, output terminals, and two pairs of opposite arms, said input terminals being adapted for connection to a source of unidirectional electrical energy, means connected in one pair of opposite arms for simultaneously varying the resistance thereof so as to unbalance said bridge circuit, a saturable core reactor having saturating winding means and controlled winding means, said saturating winding means comprising three coils, two of said coils being connected in the other pair of opposite arms of said bridge circuit and the third coil being connected between said output terminals, and means responsive to the impedance of said controlled winding means for controlling said rebalancing means.

16. Variable impedance means comprising in combination, a saturable core reactor having saturating winding means and output winding means whose impedance is to be varied, said saturating winding means comprising three coils, an electrical bridge circuit having input terminals and output terminals and two pairs of opposite arms, said input terminals being adapted for connection to a source of unidirectional electrical energy, means for connecting one of said coils in each of one pair of the opposite arms of said bridge, means for connecting the third coil between said output terminals, a pair of variable resistance devices, means for connecting one of said devices in each of the other pair of opposite arms of said bridge, and means for simultaneously operating said devices in the same sense.

17. In combination, an electrical bridge circuit having input terminals, output terminals, and two pairs of opposite arms, said input terminals being adapted for connection to a source of unidirectional electrical energy, means connected in one pair of opposite arms for simultaneously varying the resistance thereof so as to unbalance said bridge circuit, a saturable core reactor having saturating winding means and controlled winding means, said saturating winding means comprising three coils, two of said coils being connected in the other pair of opposite arms of said bridge circuit and the third coil being connected between said output terminals, a condenser connected in parallel with said controlled winding means and tuned to resonate therewith when said bridge is balanced, a motor having a field winding and adapted to rotate in a direction determined by the phase of an alternating current supplied to said winding, means connecting said paralleled condenser and controlled winding means in series with said field winding, means for rebalancing said bridge, and a driving connection between said motor and said rebalancing means.

18. A motor control system, comprising in combination, a reversible motor having a pair of field windings adapted when supplied with alternating electrical currents displaced in time phase to cause rotation of said motor in a direction determined by the sense of displacement of said currents, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, each saturating winding means comprising a set of three coils, a normally balanced bridge circuit having input terminals, output terminals, and two pairs of opposite arms, said input terminals being adapted for connection to a source of unidirectional electrical energy, one of said arms including in series a first coil of each set, a second of said arms opposite said one arm including in series a second coil of each set, and a connection between said output terminals including in series the third coil of each set, said first and second coils being connected and arranged on their respective reactors so that their magnetic effects add, said third coils being connected and arranged on their respective reactors so that upon a flow of current in a given direction through said third coils, the magnetic effect of one third coil aids and that of the other opposes the effects of their respective first and second coils, means for unbalancing said bridge, means for rebalancing said bridge, and a driving connection between said motor and said rebalancing means.

19. Variable phase splitting means, comprising in combination, a pair of terminals adapted for connection to a source of alternating electrical energy of substantially constant frequency, a pair of branch circuits connected to said terminals, a pair of saturable core reactors each comprising saturating winding means and controlled winding means, a condenser connected in parallel with each controlled winding means and tuned to resonate therewith at said frequency, a pair of networks, each comprising one of said controlled winding means and its parallel condenser, means connecting one of said networks in each of said branch circuits, each said saturating winding means comprising a pair of coils, means connecting a first coil of each pair in a first series circuit, means connecting the second coil of each pair in a second series circuit, said second coils being connected and arranged on their respective reactors so that upon a current flow in a given direction through said second series circuit, the magnetic effect of one of said second coils aids and that of the other opposes the effects of their respective first coils, and means for varying the current flow in at least one of said series circuits, thereby oppositely varying the impedances of said controlled winding means and creating a difference in phase between the alternating currents in said branch circuits.

20. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, a pair of branch circuits connected to said terminals, a pair of saturable core reactors each comprising saturating winding means and controlled winding means, a condenser connected in parallel with each controlled winding means and tuned to resonate therewith at said frequency, a pair of networks, each comprising one of said controlled winding means and its parallel condenser, means connecting one of said networks in each of said branch circuits, each said saturating winding means comprising a pair of coils, means connecting a first coil of each pair in a first series circuit, means connecting the second coil of each pair in a second series circuit, said second coils being connected and arranged on their respective reactors so that upon a current flow in a given direction through said second series circuit, the magnetic effect of one of said second coils aids and that of the other opposes the effects of their respective first coils, means connecting each of said field windings in one of said branch circuits in series with one of said networks, and means for varying the current flow in at least one of said series circuits, thereby oppositely varying the impedances of said controlled winding means and creating a difference in phase between the alternating currents in said branch circuits.

21. Variable phase splitting means, comprising in combination, a pair of terminals adapted for connection to a source of alternating electrical energy of substantially constant frequency, a pair of branch circuits connected to said terminals, a pair of saturable core reactors each comprising saturating winding means and controlled winding means, a condenser connected in parallel with each controlled winding means and tuned to resonate therewith at said frequency, a pair of networks, each comprising one of said controlled winding means and its parallel condenser, means connecting one of said networks in each of said branch circuits, each saturating winding means comprising a set of three coils, a normally balanced bridge circuit having input terminals, output terminals, and two pairs of opposite arms, said input terminals being adapted for connection to a source of unidirectional electrical energy, one of said arms including in series a first coil of each set, a second of said arms opposite said one arm including in series a second coil of each set, and a connection between said output terminals including in series the third coil of each set, said first and second coils being connected and arranged on their respective reactors so that their magnetic effects add, said third coils being connected and arranged on their respective reactors so that upon a flow of current in a given direction through said third coils, the magnetic effect of one third coil aids and that of the other opposes the effects of their respective first and second coils, and means for selectively unbalancing said bridge circuit in opposite directions.

22. Variable impedance means comprising in combination, a saturable core reactor having saturating winding means and controlled winding means whose impedance is to be varied, said saturating winding means comprising three coils, a normally balanced bridge circuit including two of said coils in opposite arms and the third coil between opposite terminals thereof, said third coil being formed of material having a lower specific resistance than the material of which the other two coils are formed, and means for varying the balance condition of said bridge circuit.

23. In combination, an electrical bridge circuit having input terminals, output terminals, and two pairs of opposite arms, said input terminals being adapted for connection to a source of unidirectional electrical energy, means connected in one pair of opposite arms for simultaneously varying the resistance thereof so as to unbalance said bridge circuit, a saturable core reactor having saturating winding means and controlled winding means, said saturating winding means comprising three coils, two of said coils being connected in the other pair of opposite arms of said bridge circuit and the third coil being connected between said output terminals, said third coil being formed of material having a lower specific resistance than the material of which the other two coils are formed, and means responsive to the impedance of said controlled winding means for controlling said rebalancing means.

24. A motor control system, comprising in combination, a reversible motor having a pair of field windings adapted when supplied with alternating electrical currents displaced in time phase to cause rotation of said motor in a direction determined by the sense of displacement of said currents, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, each said saturating winding means comprising a pair of coils, means connecting a first coil of each pair in a first series circuit, means connecting the second coil of each pair in a second series circuit, said second coils being connected and arranged on their respective reactors so that upon a current flow in a given direction through said second series circuit, the magnetic effect of one of said second coils aids and that of the other opposes the effects of their respective first coils, and means for simultaneously and oppositely varying the current flow in said series circuits.

25. A motor control system, comprising in combination, a motor having a pair of field windings, impedance means for controlling the energization of said field windings, said impedance means comprising, for each winding, a saturable core reactor having saturating winding means and controlled winding means, each said saturating winding means comprising a pair of coils, means connecting a first coil of each pair in a first series circuit, means connecting the second coil of each pair in a second series circuit, said second coils being connected and arranged on their respective reactors so that upon a current flow in a given direction through said second series circuit, the magnetic effect of one of said second coils aids and that of the other opposes the effects of their respective first coils, and means for simultaneously and oppositely varying the current flow in said series circuits.

26. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, a pair of saturable core reactors, each having saturating winding means and controlled winding means, a pair of electrical networks tuned to be normally resonant at said frequency, each said network including one of said controlled winding means and a condenser in parallel, means connecting said windings to said terminals including one of said networks in series with each winding, a normally balanced control circuit including a control potentiometer and a rebalancing potentiometer, each potentiometer comprising a slidewire resistance and a movable slider cooperating therewith, a connection between each terminal of the control potentiometer slidewire and a corresponding terminal of the rebalancing potentiometer slidewire, said control circuit being effective upon unbalance thereof to differentially vary the currents in said connections, and means connecting each of said saturating windings in one of said connections.

27. A motor control system, comprising in combination, a motor having a pair of field windings adapted when supplied with alternating electrical currents displaced in time phase to cause rotation of said motor, a pair of terminals adapted for connection to a source of alternating electrical energy of substantially constant frequency, a saturable core reactor, having saturating winding means and controlled winding means, an electrical network tuned to be normally resonant at said frequency, said network including said controlled winding means and a condenser in parallel, means connecting one of said windings to said terminals including said network in series therewith, said saturating winding means comprising three coils, a normally balanced bridge circuit including two of said coils in opposite arms and the third coil between opposite terminals thereof, means for unbalancing said bridge circuit so as to vary the impedance of said controlled winding means, and thereby vary the phase of the alternating current supplied to said one field winding, and constant impedance means connecting the other of said field windings to said pair of terminals.

HUBERT T. SPARROW.